United States Patent [19]

Sagawa et al.

[11] Patent Number: 5,252,670
[45] Date of Patent: Oct. 12, 1993

[54] POWDER COATING MATERIAL AND A RECOAT STEEL PLATE

[75] Inventors: Chiaki Sagawa, Tokyo; Eiji Shimada, Yokohama; Shingo Okamoto, Fujisawa, all of Japan

[73] Assignee: NOF Corporation, Tokyo, Japan

[21] Appl. No.: 974,770

[22] Filed: Nov. 12, 1992

[30] Foreign Application Priority Data

Nov. 15, 1991 [JP] Japan ................... 3-300789

[51] Int. Cl.$^5$ .................................... C08G 18/80
[52] U.S. Cl. ................................. 525/124; 528/45; 428/425.8
[58] Field of Search .................... 525/124; 528/45; 428/425.8

[56] References Cited

U.S. PATENT DOCUMENTS

| | | | |
|---|---|---|---|
| 3,919,174 | 11/1975 | Taller | 528/45 |
| 4,184,031 | 1/1980 | Graham et al. | 528/45 |
| 5,091,475 | 2/1992 | Potter et al. | 528/45 |

FOREIGN PATENT DOCUMENTS 0070118 1/1983 European Pat. Off.
1957483 5/1971 Fed. Rep. of Germany.

*Primary Examiner*—Maurice J. Welsh
*Attorney, Agent, or Firm*—Millen, White, Zelano & Branigan

[57] ABSTRACT

A powder coating composition comprises 100 weight parts of the total of a polyester resin having a hydroxyl value in the range from 20 to 100 KOH mg/g and a blocked polyisocyanate compound, 0.01 to 3 weight parts of an organotin compound and 0.01 to 10 weight parts of a carboxylic acid compound having an acid value of 1000 KOH mg/g or less which can form a complex compound by reaction with the organotin compound. The amount of the polyester resin is in the range from 95 to 50 weight % and the amount of the blocked polyisocyanate compound is in the range from 5 to 50 weight % respectively based on the total of the polyester resin and the blocked polyisocyanate compound. A precoat steel plate is prepared by coating the powder coating composition described above on a steel plate by a electrostatic powder coating method to form a coating layer having a thickness in the range from 20 to 120 μm and curing the coating composition by baking at a temperature in the range from 190° to 300° C. for a time in the range from 20 seconds to 10 minutes. The powder coating composition can be cured without formation of blisters and pin holes under a desired condition by controlling the rate of the curing reaction.

13 Claims, 1 Drawing Sheet

AMOUNT OF CARBOXYLIC ACID COMPOUND
(WEIGHT PART)

POWDER COATING MATERIAL AND A RECOAT STEEL PLATE

BACKGROUND OF THE INVENTION

1. Field of the Invention

The present invention relates to a novel powder coating material in which rate of the curing reaction can be easily controlled, from which coating layers having excellent appearance and excellent physical properties can be obtained under a desired condition in accordance with the object and which is particularly useful as a powder coating material for precoat steel plates requiring curing by baking at a high temperature in a short time. The present invention also relates to a novel precoat steel plate prepared by utilizing the powder coating composition described above.

2. Description of the Prior Art

Coating materials for precoat steel plates are generally cured at a high temperature, such as 190° C. or above, preferably 210° C. or above, in a short time, such as 10 minutes or less, preferably 3 minutes or less. Polyester resin powder coating materials having excellent workability are utilized for this application. For curing the coating material in a short time, catalysts, such as organotin compounds, are utilized (K. C. Frish et al., J. Macromol. Sci.-Reviews, Macromol. Chem., C5(1), 103-149 (1970)).

However, because the organotin compounds are catalysts of the reaction, it is difficult to adjust the rate of the reaction to conform with a desired condition though the reaction can be accelerated. For example, when the rate of reaction is increased, gas generated from the formed coating layer during the curing and air contained between particles of the powder coating material remain in the coating material without being completely eliminated to cause formation of blisters and pin holes in the coating layer. When the organotin catalyst is not utilized, the reaction is too slow and the coating layer having satisfactory properties cannot be obtained. These phenomena are particularly remarkably observed when a coating is cured at a higher temperature in a short time. The reaction cannot be controlled to the desired condition by using an organotin catalyst alone. For preventing the formation of blisters in the coating, various methods, such as utilization of resins having low melt viscosity, addition of thermoplastic resins and the like compounds which do not contribute to the reaction and formation of thinner coating layers, have been proposed.

However, these proposed methods have a problem that the curing reaction cannot be controlled satisfactorily and the sufficient crosslinking cannot be achieved either.

SUMMARY OF THE INVENTION

The present invention accordingly has an object to provide a powder coating composition which can be cured without formation of blisters and pin holes under a desired condition in accordance with the object by controlling the rate of the curing reaction. Another object of the invention is to provide a precoat steel plate utilizing the powder coating composition described above.

Thus, the powder coating composition comprises 100 weight parts of the total of a polyester resin having a hydroxyl value in the range from 20 to 100 KOH mg/g and a blocked polyisocyanate compound, 0.01 to 3 weight parts of an organotin compound and 0.01 to 10 weight parts of a carboxylic acid compound having an acid value of 1000 KOH mg/g or less which can form a complex compound by reaction with the organotin compound. The amount of the polyester resin is in the range from 95 to 50 weight % and the amount of the blocked polyisocyanate compound is in the range from 5 to 50 weight % respectively based on the total of the polyester resin and the blocked polyisocyanate compound.

The precoat steel plate is prepared by coating the powder coating composition described above on a steel plate by a electrostatic powder coating method to form a coating layer having a thickness in the range from 20 to 120 μm and curing the coating composition by baking at a temperature in the range from 190° to 300° C. for a time in the range from 20 seconds to 10 minutes.

Other and further objects, features and advantages of the invention will appear more fully from the following description.

BRIEF DESCRIPTION OF THE DRAWING

The invention will be described with reference to the accompanying drawing, wherein.

DETAILED DESCRIPTION OF THE INVENTION

Figure 1:
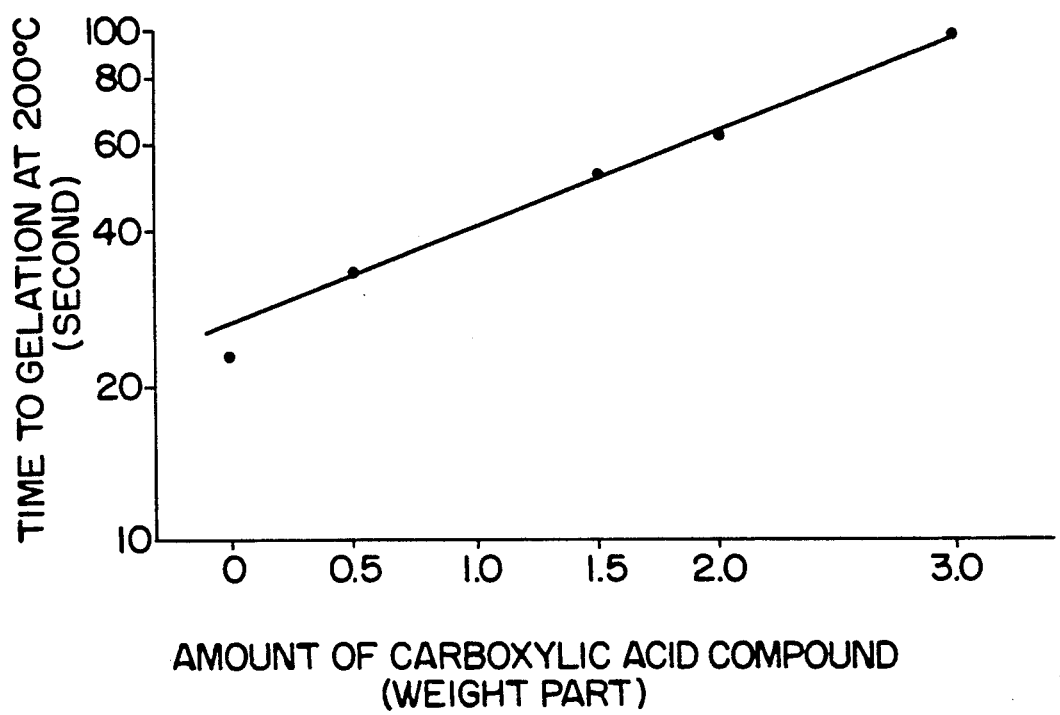
FIG. 1 is a graph showing the relation between the time to gelation of the powder coating compositions prepared in Examples 1 to 5 and Comparative Example 1 and the amount of the specific carboxylic acid compounds utilized in the powder coating compositions.

The invention is described in detail in the following.

The powder coating composition of the invention comprises a polyester resin having a specific hydroxyl value, a blocked isocyanate compound, an organotin compound which works as a catalyst in the reaction of the polyester resin and the blocked isocyanate compound and a specific carboxylic acid compound which forms a complex compound by reaction with the organotin compound and controls the catalytic activity.

The polyester resin utilized in the invention is a polyester resin having the hydroxyl value in the range from 20 to 100 KOH mg/g and preferably in the range from 20 to 70 KOH mg/g. The polyester resin is preferably a solid resin at the room temperature having two or more hydroxyl group in average in the molecule. Number average molecular weight of the polyester resin is preferably in the range from 1500 to 8000. The polyester resin can be prepared by direct esterification of a carboxylic acid compound with a polyfunctional alcohol compound, such as ethylene glycol, preferably with a charge ratio of 1:1.0 to 2.0 (mol ratio). Commercial polyester resins may be utilized as well. The esterification reaction is preferably made at a temperature in the range from 220° to 280° C. for a time in the range from 3 to 24 hours. Examples of the carboxylic acid compound utilized for the esterification are: terephthalic acid, isophthalic acid, phthalic acid, succinic acid, glutaric acid, adipic acid, sebacic acid, β-oxypropionic acid, oxalic acid, maleic anhydride, trimellitic anhydride, pyromellitic acid, mixtures of these compounds and the like compounds. Examples of the polyfunctional alcohol compound utilized for the esterification are: ethylene glycol, diethylene glycol, propanediol, butanediol, pentanediol, 1,6-hexanediol, neopentyl glycol, 2,2'-diethylene propanediol, cyclohexanediol, trimethylolpropane, pentaerythritol, polypropylene glycol, mixtures of these compounds and the like compounds.

The blocked isocyanate compound utilized in the invention is the component which reacts with the hydroxyl group in the polyester resin described above. It is preferable that the blocked isocyanate compound has two or more isocyanate groups in average in the molecule. Examples of the blocked isocyanate compound are compounds prepared by blocking, with a blocking agent, free isocyanate groups in polyisocyanate compounds, addition products of polyisocyanate compounds with polyfunctional alcohols, diisocyanate polymers like biuret compounds, isocyanurate compounds or the like. Commercial blocked isocyanate compounds may be utilized. Examples of the polyisocyanate compound are: isophorone diisocyanate, tetramethylene diisocyanate, hexamethylene diisocyanate, lysine diisocyanate, xylylene diisocyanate and the like. Examples of the polyfunctional alcohol are: ethylene glycol, diethylene glycol, propanediol, butanediol, pentanediol, 1,6-hexanediol, neopentyl glycol, 2,2'-diethylene propanediol, cyclohexanediol, trimethylolpropane, pentaerythritol, polypropylene glycol and the like. Examples of the blocking agent are: methanol, ethanol, ε-caprolactam, 2-pyrrolidone, MEK oxime, acetoxime, phenol and the like. In the blocked isocyanate compound, the blocked isocyanate group generates a free isocyanate group by dissociation of the blocking agent and the generated free isocyanate group reacts with the hydroxyl group in the polyester resin.

In the powder coating composition of the invention, 95 to 50 weight % of the polyester resin and 5 to 50 weight % of the blocked isocyanate compound based on the total of the polyester resin and the blocked isocyanate compound are mixed. When the amount of the polyester resin is more than 95 weight %, crosslinking reaction becomes insufficient and the desired properties are not likely to be obtained. When the amount of the polyester resin is less than 50 weight %, the coating layer formed becomes too hard and fragile. When the properties of the coating layer formed and the properties of the coating material are considered in combination, the equivalent ratio of the hydroxyl group to the isocyanate group is preferably in the range from 0.5 to 1.5. When the equivalent ratio is outside of this range, properties of the coating layer is deteriorated and the condition is not desirable.

The organotin compound utilized in the invention is a compound which works as a catalyst of the curing reaction of the polyol compound, such as the polyester resin comprising hydroxyl group, with the isocyanate. Preferable examples of the organotin compound are: stannous acetate, stannic acetate, stannous octanoate, dibutyltin dioctanoate, dibutyltin dilaurate, tin mercaptide, stannous citrate, stannous oxylate, stannous chloride, stannic chloride, tetraphenyltin, tetrabutyltin, tri-n-butyltin acetate, dialkyltin monocarboxylates, dialkyltin dicarboxylates and the like. Amount of the organotin compound comprised in the powder coating composition is in the range from 0.01 to 3 weight parts based on 100 weight parts of the total of the polyester resin and the blocked isocyanate compound. When the amount is less than 0.01 weight parts, the curing reaction is too slow and curing cannot be finished in a short time and, when the amount is more than 3 weight parts, the curing reaction is too fast and pin holes and blisters are formed in the coating layer.

The specific carboxylic acid compound utilized in the invention is a component which works as an agent adjusting the rate of the curing reaction. It is a compound forming a complex compound by the reaction with the organotin compound described above and having the acid value of 1000 KOH mg/g or less and preferably 500 KOH mg/g or less. When the acid value of the carboxylic acid compound is more than 1000 KOH mg/g, the ability of adjusting the rate of the curing reaction is insufficient and physical properties and levelling property of the coating layer are deteriorated to cause poor appearance of the coating layer. When the carboxylic acid compound forms a complex compound by the reaction with the organotin compound, the tin atom in the organotin compound forms a complex compound with the carboxyl group in the carboxylic acid compound and this causes decrease of the catalytic reactivity of the organotin compound.

It is preferred that the carboxylic acid compound is compatible with the polyester resin. The carboxylic acid compound is more preferably an acid, an acid anhydride or an esterification product which has melting point of 200° C. or lower and is derived from a single kind of carboxylic acid. Examples of the carboxylic acid compound having the melting point of 200° C. or lower described above are maleic anhydride, adipic acid, maleic acid, phthalic anhydride, dodecane diacid and esterification products obtained by the reaction of these compounds with a monoalcohol or diol having 1 to 20 carbon atoms. The carboxylic acid compound is more preferably an acid, an acid anhydride or an esterification product derived from a copolymer of one or more of the carboxylic acid compounds having the melting point of 200° C. or lower described above as well as the carboxylic acid compound having the melting point of 200° C. or lower described above. Examples of the carboxylic acid compound derived from a copolymer are copolymers of vinyl compounds with acids, acid anhydrides and esterification products having double bonds, such as copolymers of styrene and maleic anhydride (for example, SMA Resin ®, a product of ARCO Chemical Co.), copolymers of styrene and acrylic acid or methacrylic acid, copolymers of styrene, maleic anhydride and allyl ether of polyethylene glycol, acrylic resins comprising carbonyl group prepared from several kinds of vinyl compounds and the like. Number average molecular weight of the acid, the acid anhydride or the esterification product derived from a copolymer is preferably in the range from 200 to 100000.

Amount of the carboxylic acid compound comprised in the powder coating composition is in the range from 0.01 to 10 weight parts and preferably in the range from 0.05 to 5 weight parts based on 100 weight parts of the total of the polyester resin and the organotin compound. When the amount of the carboxylic acid compound is less than 0.01 weight parts, the rate of the curing reaction cannot be adjusted effectively and, when the amount is more than 10 weight parts, appearance and physical properties of the coating layer are deteriorated.

In the powder coating composition of the invention, other ingredients may be added according to necessity in addition to the essential components which are the polyester resin, the blocked isocyanate compound, the organotin compound and the specific carboxylic acid compound. Examples of such additional ingredients are: inorganic pigments, such as titanium dioxide, carbon black, iron oxides, yellow lead and the like; organic pigments, such as phthalocyanine green, phthalocyanine blue and the like; fillers, such as barium sulfate, mica, tarc, zinc oxide and the like; metal powders, such as aluminum powder, copper powder, nickel powder and the like; dyes; pigment dispersants; surface conditioners; catalysts and the like.

It is preferred that the powder coating composition of the invention has a glass transition temperature in the range from 40° to 80° C. so that the storage stability of the powder coating material and the appearance of the coating layer are kept excellent.

A coating material can be prepared by utilizing the coating composition of the invention, for example, by the following method. The components of the coating material are mixed by a mixer, such as Henshel Mixer ® (a product of Mitsui Kakoki Co., Ltd.), and then melt mixed by an extruder mixer, such as Bussco Kneader PR46 ® (a product of Buss Co.) at a temperature in the range from 50° to 150° C. The mixed material is cooled, pulverized by a hammer type impact pulverizer and filtered to obtain a powder coating material.

The precoat steel plate of the invention can be prepared by coating the powder coating composition described above by the electrostatic powder coating method on a steel plate to form coating layer having a specific thickness and then curing the coating layer by baking in a specific condition.

Examples of the steel plate utilized in the precoat steel plate of the invention are material steel plates, such as steel plates, zinc plated steel plates, stainless steel plates, aluminum plated steel plates and the like, steel plates treated with a primer coating on the material steel plates, conventional precoat steel plates and the like.

The thickness of the coating layer of the powder coating composition formed on the steel plate by the electrostatic powder coating method is in the rage from 20 to 120 μm and preferably in the range from 30 to 90 μm. Examples of the electrostatic powder coating method are methods utilizing electrostatic powder coating machines of, for example, friction charging type, corona charging type and the like other types. When the thickness of the coating layer is less than 20 μm or more than 120 μm, the coating layer having satisfactory appearance cannot be obtained.

The coated steel plate is cured by baking at a temperature in the range from 190° to 300° C., preferably in the range from 210° to 280° C. for a time in the range from 20 seconds to 10 minutes, preferably in the range from 1 to 5 minutes. When either one or both of the temperatures and the time of the curing by baking is outside of the specified range described above, productivity of the precoat steel plate is decreased and the condition is not desirable. As the furnace for the curing by baking of the coating, an induction heated furnace, an infrared heated furnace, a hot air circulation furnace and the like can be utilized.

To summarize the advantages obtained by the invention, the powder coating composition of the invention comprises the specific kind of carboxylic acid compound and the rate of the curing reaction during the formation of the coating layer can be adjusted. Therefore, the coating layer can be formed in a desired condition of curing without having deteriorating effect on the appearance and the physical properties of the coating layer. The precoat steel plate of the invention can be obtained by utilizing the powder coating composition described above in a desired condition without having deteriorating effect on the appearance and the physical properties of the coating layer.

DESCRIPTION OF THE PREFERRED EMBODIMENTS

The invention will be understood more readily with reference to the following examples; however, these examples are intended to illustrate the invention and are not to be construed to limit the scope of the invention.

EXAMPLE 1

Into a dry blender (Henshel Mixer ®, a product of Mitsui Kakoki Co., Ltd.), 77.5 parts of a polyester resin comprising hydroxyl group (Yupika Coat GY740 ®, a product of Nippon Yupika Co., Ltd., number average molecular weight, 3000; and hydroxyl value, 52 KOH mg/g), 22.5 parts of a blocked isocyanate compound (Adduct B-1530 ®, a product of Hüls Co., isophorone diisocyanate blocked with $\epsilon$-caprolactam), 0.3 parts of an organotin compound (Stan OM ®, a product of Sankyo Yuki Co., Ltd.), 0.5 parts of a carboxylic acid compound (SMA Resin 3840A ®, a product of ARCO Chemical Co.), 0.5 parts of an additive (Modaflow ®, a product of Monsanto Co.) and 0.5 parts of benzoin were charged and mixed homogeneously for about 1 minute. Then, the mixture was melt mixed at the temperature of 80° to 120° C. by using an extruder mixer (Bussco Kneader PR46 ®, a product of Buss Co.), cooled and pulverized by using a hammer type impact pulverizer. The pulverized product was filtered with a 180 mesh metal screen to obtain a powder coating material. Composition of the coating material thus prepared is shown in Table 1. Glass transition temperature of the coating material was 53° C.

Rate of the reaction of the powder coating material prepared above was evaluated by placing 0.5 mg of the powder coating material on a hot plate adjusted to the temperature of 200° C. and measuring time to gelation of the coating material. Result of the measurement is shown in FIG. 1.

The result in Table 1 shows that the rate of curing can be controlled in a desired condition by adjusting the amount of the carboxylic acid compound based on a specified amount of the organotin compound.

The powder coating material prepared above was coated on a melt alloy zinc plated steel plate of 0.6 mm thickness treated with the chromate treatment by using an electrostatic powder coating machine of the corona charging type at the charging voltage of −40 to 100 KV to form a coating layer having a thickness of 70 to 80 μm. Then, the coated steel plate was cured by baking in the condition shown in Table 2 and a test piece was prepared. The test piece was evaluated on appearance of the coating layer, impact resistance and flexibility by the methods described below. Results are shown in Table 2. The temperature of curing by baking is made higher than the temperature of the measurement of the time to gelation because heating of the test piece to the desired temperature required a longer time and a higher temperature than the measurement of the time to gelation.

Evaluation of Appearance of Coating Layer

Formation of pin holes and blisters and shape of the image of a fluorescent light reflected by the coating layer were visually observed and the smoothness and the sharpness of reflection of the coating layer were evaluated.

Impact Resistance Test

The impact resistance test was made according to the method of Japanese Industrial Standard K5400 (1990) 8.3.2, the method of Du Pont. A weight of 1000 g having a diameter of 6.35 mm was used and the maximum height from which no craze, crack or separation was formed on the coating layer was measured.

Flexibility Test

A test piece was bent to the angle of 180° at 20° C. by using a vice tester. In some tests, plates having the same thickness as that of the test piece (0.6 mm) were inserted to the inner side of the test piece to make a larger radius of curvature and the formation of craze, crack and separation on the coating layer was visually examined. When the number of the inserted plate was 0, 1 and 2, the condition was marked as 0T, 1T and 2T, respectively.

EXAMPLES 2 TO 10 AND COMPARATIVE EXAMPLES 1 AND 2

Powder coating materials were prepared and evaluated by the same method as in Example 1 except that the composition was varied as shown in Table 1. Results are shown in Table 2 and 3.

TABLE 1

| Example | | 1 | 2 | 3 | 4 | 5 | 6 | 7 | 8 | 9 | 10 | — | — |
|---|---|---|---|---|---|---|---|---|---|---|---|---|---|
| Comparative Example | | — | — | — | — | — | — | — | — | — | — | 1 | 2 |
| Components of coating material | | | | | | | | | | | | | |
| polyester resin | Yupika Coat GV740 ®[1] | 77.5 | 77.5 | 77.5 | 77.5 | 77.5 | 77.5 | 77.5 | 77.5 | 77.5 | 77.5 | 77.5 | 77.5 |
| blocked isocyanate compound | Adduct B-1530 ®[2] | 22.5 | 22.5 | 22.5 | 22.5 | 22.5 | 22.5 | 22.5 | 22.5 | 22.5 | 22.5 | 22.5 | 22.5 |
| organotin compound | Stan OM ®[3] | 0.3 | 0.3 | 0.3 | 0.3 | 0.3 | 0.3 | 0.3 | 0.3 | 0.3 | 0.3 | 0.3 | 0.2 |
| carboxylic acid compound | SMA 3840A ®[4] | 0.5 | 1.0 | 1.5 | 2.0 | 3.0 | — | — | — | — | — | — | — |
| | Additol VXL1524 ®[5] | — | — | — | — | — | 1.0 | — | — | — | — | — | — |
| | Dodecane diacid | — | — | — | — | — | — | 1.0 | — | — | — | — | — |
| | J-67 ®[6] | — | — | — | — | — | — | — | 1.0 | — | — | — | — |
| | PA-18 ®[7] | — | — | — | — | — | — | — | — | 1.0 | — | — | — |
| | Almatex AP3329 ®[8] | — | — | — | — | — | — | — | — | — | 1.0 | — | — |
| additive | Modaflow ®[9] | 0.5 | 0.5 | 0.5 | 0.5 | 0.5 | 0.5 | 0.5 | 0.5 | 0.5 | 0.5 | 0.5 | 0.5 |
| | benzoin | 0.5 | 0.5 | 0.5 | 0.5 | 0.5 | 0.5 | 0.5 | 0.5 | 0.5 | 0.5 | 0.5 | 0.5 |
| thermoplastic resin | Mitsui High Wax 2LOM ®[10] | — | — | — | — | — | — | — | — | — | — | — | 5.0 |
| pigment | Tipure R-960 ®[11] | 50.0 | 50.0 | 50.0 | 50.0 | 50.0 | 50.0 | 50.0 | 50.0 | 50.0 | 50.0 | 50.0 | 50.0 |
| glass transition temperature (°C.) | | 53 | 53 | 53 | 53 | 52 | 53 | 53 | 53 | 53 | 53 | — | — |

[1] A product of DSM Yupika Co., Ltd.; number average molecular weight, 3000; hydroxyl value, 50 KOH mg/g.
[2] A product of Hüls Co.; isophorone diisocyante blocked with ε-caprolactam; NCO equivalent, 280 g/eq.
[3] A product of Sankyo Yukigosei Co., Ltd.; di-n-octyltin maleate.
[4] A product of ARCO Chemical Co., number average molecular weight, 2300; acid value, 105 KOH mg/g; an esterification product of copolymer of styrene and maleic anhydride.
[5] A product of Höchst Co.; ethylene glycol ditrimellitate.
[6] A product of SC Johnson Co.; number average molecular weight, 3100; acid value, 195 KOH mg/g; glass transition temperature, 70°C.
[7] A product of Gulf Co.; number average molecular weight, 14000; acid value 337 KOH mg/g; melting point, 110~120°C.
[8] A product of Mitsui Toatsu Kagaku Co., Ltd.; an acrylic resin; acid value, 33 KOH mg/g; glass transition temperature 75° C.
[9] A product of Monsanto Co.; a surface conditioner.
[10] A product of Mitsui Sekiyukagaku Kogyo Co., Ltd.; number average molecular weight, 2000; a polyethylene wax.
[11] A product of Du Pont Co.; titanium dioxide.

TABLE 2

| | Example 1 | | | Example 2 | | | Example 3 | | | Example 4 | | | Example 5 | | | Comparative Example 1 | | | Comparative Example 2 | | |
|---|---|---|---|---|---|---|---|---|---|---|---|---|---|---|---|---|---|---|---|---|---|
| desired curing condition | (235~240° C.) | | | (240~245° C.) | | | (245~250° C.) | | | (250~255° C.) | | | (255~260° C.) | | | — | | | — | | |
| testing item (notes) | (1) | (2) | (3) | (1) | (2) | (3) | (1) | (2) | (3) | (1) | (2) | (3) | (1) | (2) | (3) | (1) | (2) | (3) | (1) | (2) | (3) |
| thickness of coating layer (μm) | 50 | 50 | 50 | 50 | 50 | 50 | 50 | 50 | 50 | 50 | 50 | 50 | 50 | 50 | 50 | 50 | 50 | 50 | 50 | 50 | 50 |
| curing condition | | | | | | | | | | | | | | | | | | | | | |
| 230° C., 3 min. | ○ | 80 | 0T | ○ | 70 | 2T | ○ | 20 | X | ○ | 10 | X | ○ | 10 | X | X | 100 | 0T | ○ | 70 | 1T |
| 235° C., 3 min. | ○ | 100 | 0T | ○ | 100 | 1T | ○ | 50 | 2T | ○ | 20 | X | ○ | 10 | X | X | 100 | 1T | ○ | 70 | 2T |
| 240° C., 3 min. | ○ | 100 | 0T | ○ | 100 | 0T | ○ | 70 | 1T | ○ | 30 | 2T | ○ | 30 | X | X | 100 | 1T | ○ | 70 | 2T |
| 245° C., 3 min. | X | 70 | 1T | ○ | 100 | 0T | ○ | 100 | 0T | ○ | 70 | 1T | ○ | 50 | 2T | X | 100 | 1T | X | 50 | 2T |
| 250° C., 3 min. | X | 50 | 1T | X | 100 | 0T | ○ | 100 | 0T | ○ | 100 | 0T | ○ | 70 | 1T | X | 70 | 1T | X | 50 | 2T |
| 255° C., 3 min. | X | 50 | 2T | X | 70 | 1T | X | 100 | 0T | ○ | 100 | 0T | ○ | 100 | 0T | X | 50 | 2T | X | 50 | 2T |
| 260° C., | X | 50 | 2T | X | 70 | 1T | X | 70 | 0T | X | 100 | 0T | ○ | 100 | 0T | X | 50 | 2T | X | 30 | X |

TABLE 2-continued

|  | Example 1 | Example 2 | Example 3 | Example 4 | Example 5 | Comparative Example 1 | Comparative Example 2 |
|---|---|---|---|---|---|---|---|
| 3 min. | | | | | | | |

(notes)
(1) Appearance of the coating layer:
◯: no pin holes or blisters were found on the coating layer; no strain was observed on the image of a fluorescent light reflected by the coating layer.
X: pin holes and blisters were found on the coating layer; and/or strain was observed on the image of a fluorescent light reflected by the coating layer.
(2) Impact resistance: the maximum height from which no craze, crack or separation was formed on the coating layer (cm); 100 cm: passed; less than 100 cm: failed.
(3) Flexibility: the bending condition in which no craze or crack was formed on the coating layer is listed; X means formation of craze and crack on the coating layer in the condition of 2T; 0T: passed; others: failed.

TABLE 3

|  | Example 6 | | | Example 7 | | | Example 8 | | | Example 9 | | | Example 10 | | |
|---|---|---|---|---|---|---|---|---|---|---|---|---|---|---|---|
| desired curing condition | (240~245° C.) | | | (240~245° C.) | | | (240~245° C.) | | | (240~245° C.) | | | (240~245° C.) | | |
| testing item (notes) | (1) | (2) | (3) | (1) | (2) | (3) | (1) | (2) | (3) | (1) | (2) | (3) | (1) | (2) | (3) |
| thickness of coating layer (μm) | 50 | 50 | 50 | 50 | 50 | 50 | 50 | 50 | 50 | 50 | 50 | 50 | 50 | 50 | 50 |
| curing condition | | | | | | | | | | | | | | | |
| 230° C., 3 min. | ◯ | 70 | 2T | ◯ | 70 | 2T | ◯ | 70 | 2T | ◯ | 70 | 2T | ◯ | 70 | 2T |
| 235° C., 3 min. | ◯ | 100 | 1T | ◯ | 100 | 1T | ◯ | 100 | 1T | ◯ | 100 | 1T | ◯ | 100 | 1T |
| 240° C., 3 min. | ◯ | 100 | 0T | ◯ | 100 | 0T | ◯ | 100 | 0T | ◯ | 100 | 0T | ◯ | 100 | 0T |
| 245° C., 3 min. | ◯ | 100 | 0T | ◯ | 100 | 0T | ◯ | 100 | 0T | ◯ | 100 | 0T | ◯ | 100 | 0T |
| 250° C., 3 min. | X | 100 | 0T | X | 100 | 0T | X | 100 | 0T | X | 100 | 0T | X | 100 | 0T |
| 255° C., 3 min. | X | 70 | 1T | X | 70 | 1T | X | 70 | 1T | X | 70 | 1T | X | 70 | 1T |
| 260° C., 3 min. | X | 70 | 1T | X | 70 | 1T | X | 70 | 1T | X | 70 | 1T | X | 70 | 1T |

(notes)
(1) Appearance of the coating layer:
◯: no pin holes or blisters were found on the coating layer; no strain was observed on the image of a fluorescent light reflected by the coating layer.
X: pin holes and blisters were found on the coating layer; and/or strain was observed on the image of a fluorescent light reflected by the coating layer.
(2) Impact resistance: the maximum height from which no craze, crack or separation was formed on the coating layer (cm); 100 cm: passed; less than 100 cm: failed.
(3) Flexibility: the bending condition in which no craze or crack was formed on the coating layer is listed; X means formation of craze and crack on the coating layer in the condition of 2T; 0T: passed; others: failed.

The results in FIG. 1, Table 2 and Table 3 clearly show that, in the coating material utilizing the powder coating composition of the invention comprising the specific kind of carboxylic acid compound, the rate of the reaction of curing can be varied easily by adjusting the amount of the specific carboxylic acid compound comprised in the composition and that, as the result of this controlling ability, the excellent appearance and properties of the coating layer can be achieved by the desired condition of curing suited to the object.

In example 1, a coating layer having excellent appearance and physical properties could be obtained by adjusting the amount of the added carboxylic acid compound to 0.5 weight parts in the desired curing condition of 235° to 240° C. and 3 minutes. A coating layer having excellent appearance and physical properties could be obtained by varying the amount of the carboxylic acid compound in each of Examples 2 to 10 wherein the desired curing condition was 240° to 245° C. and 3 minutes in Example 2, 245° to 250° C. and 3 minutes in Example 3, 250° to 255° C. and 3 minutes in Example 4, 255° to 260° C. and 3 minutes in Example 5, and 240° to 245° C. and 3 minutes in Examples 6 to 10. On the contrary, in Comparative Example 1 in which no carboxylic acid compound was added, no baking condition in which both of the appearance and the physical properties of the coating layer were excellent could be found within 230° to 260° C. In comparative Example 2, the appearance was improved by adding the thermoplastic resin at the curing temperature of 230° to 240° C. but no condition in which the physical properties were excellent was found within the curing condition of 230° to 260° C.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A powder coating composition comprising 100 weight parts of the total of a polyester resin having a hydroxyl value in the range from 20 to 100 KOH mg/g and a blocked polyisocyanate compound, 0.01 to 3 weight parts of an organotin compound and 0.01 to 10 weight parts of a carboxylic acid compound having an acid value of 1000 KOH mg/g or less which can form a complex compound by reaction with the organotin compound, the amount of the polyester resin being in the range from 95 to 50 weight % and the amount of the blocked polyisocyanate compound being in the range from 5 to 50 weight % respectively based on the total of the polyester resin and the blocked polyisocyanate compound.

2. A powder coating composition as claimed in claim 1 wherein the hydroxyl value of the polyester resin is in the range from 20 to 70 KOH mg/g.

3. A powder coating composition as claimed in claim 1 wherein the polyester resin is a solid resin at the room temperature having two or more hydroxyl group in average in the molecule.

4. A powder coating composition as claimed in claim 1 wherein equivalent ratio of the hydroxyl group to the isocyanate group is in the range from 0.5 to 1.5.

5. A powder coating composition as claimed in claim 1 wherein the acid value of the carboxylic acid compound is 500 KOH mg/g or less.

6. A powder coating composition as claimed in claim 1 wherein the carboxylic acid compound is an acid, an acid anhydride or an esterification product which has melting point of 200° C. or lower and is derived from a single kind of carboxylic acid.

7. A powder coating composition as claimed in claim 1 wherein the carboxylic acid compound is an acid, an acid anhydride or an esterification product derived from a copolymer of one or more of the carboxylic acid compounds having melting point of 200° C. or lower described in claim 6.

8. A powder coating composition as claimed in claim 1 wherein the carboxylic acid compound is maleic anhydride, adipic acid, phthalic anhydride, dodecane diacid, an esterification product obtained by the reaction of these compounds with a monoalcohol or diol having 1 to 20 carbon atoms, a copolymer of styrene and maleic anhydride, a copolymer of styrene and acrylic acid or methacrylic acid or a copolymer of styrene, maleic anhydride and allyl ether of polyethylene glycol.

9. A powder coating composition as claimed in claim 1 wherein the powder composition comprises 0.05 to 5 weight parts of the carboxylic acid compound.

10. A powder coating composition as claimed in claim 1 wherein glass transition temperature of the powder coating composition is in the range from 40° to 80° C.

11. A precoat steel plate prepared by coating the powder coating composition described in claim 1 on a steel plate by a electrostatic powder coating method to form a coating layer having a thickness in the range from 20 to 120 μm and curing the coating composition by baking at a temperature in the range from 190° to 300° C. for a time in the range from 20 seconds to 10 minutes.

12. A precoat steel plate as claimed in claim 11 wherein the thickness of the coating layer is in the range from 30 to 90 μm.

13. A precoat steel plate as claimed in claim 11 wherein the coating composition is cured by baking at a temperature in the range from 210° to 280° C.

* * * * *